April 28, 1942.  W. E. ROONEY  2,280,854
TRAY LOADING MACHINE
Filed Jan. 4, 1939  3 Sheets-Sheet 1
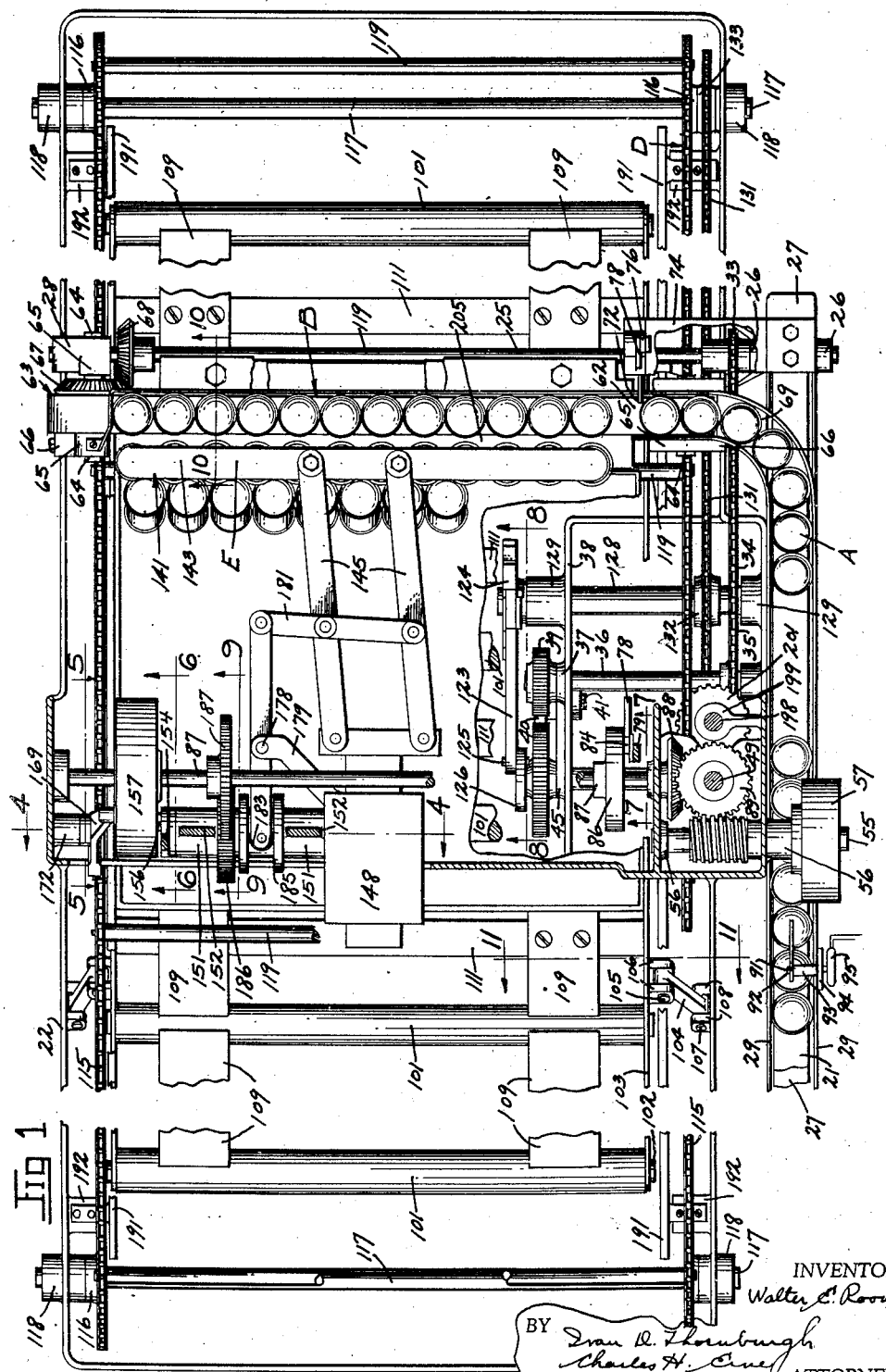
INVENTOR.
Walter E. Rooney
BY Evan D. Thornburgh
Charles H. Cine
ATTORNEYS

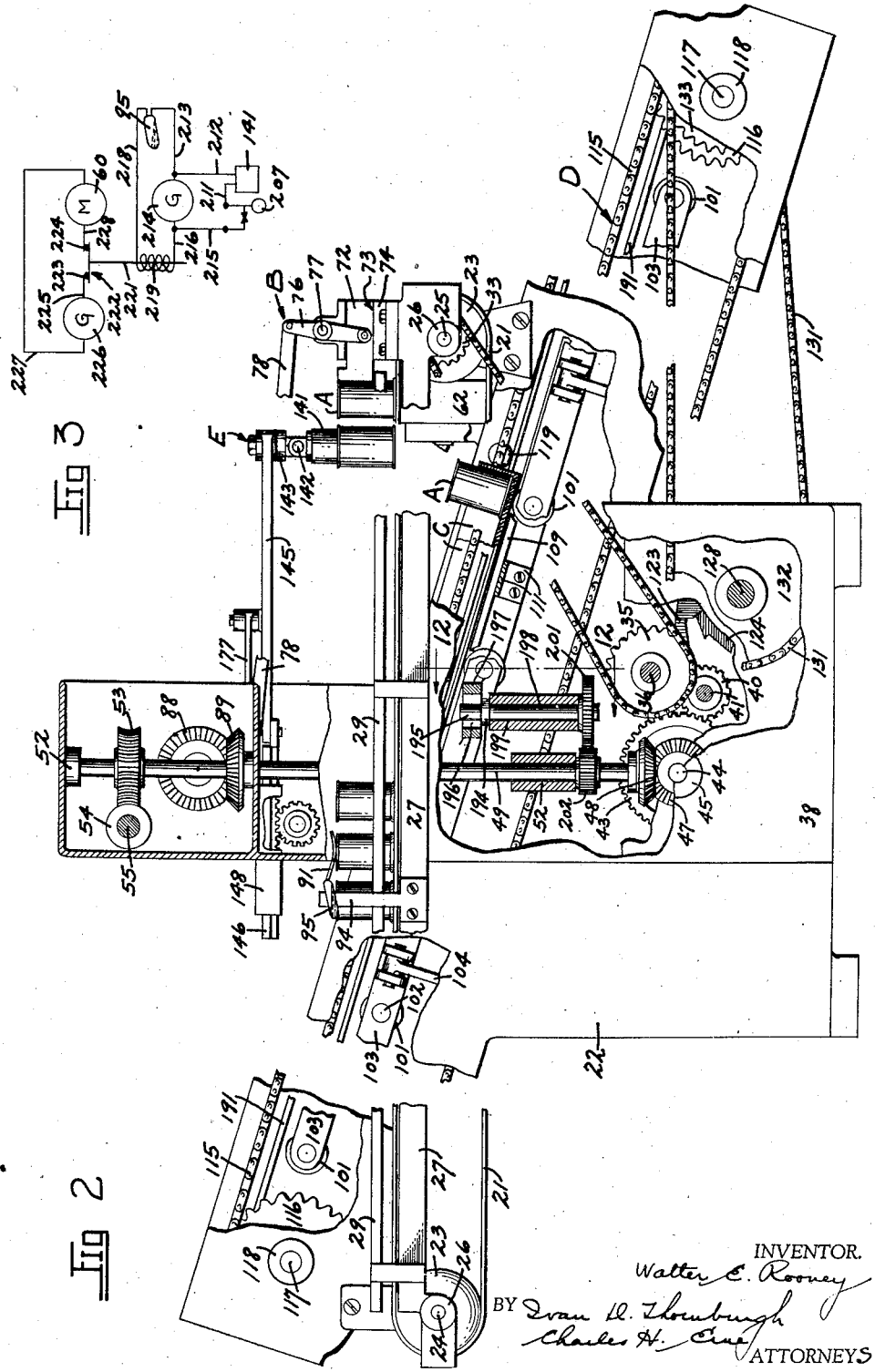

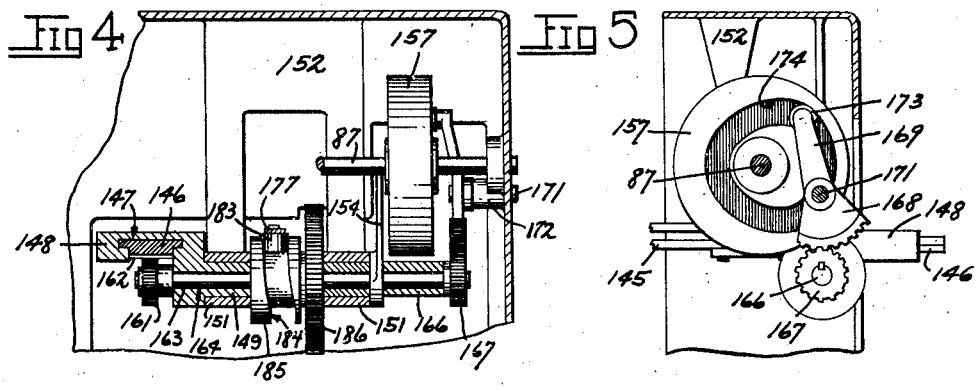

Patented Apr. 28, 1942

2,280,854

UNITED STATES PATENT OFFICE 2,280,854

TRAY LOADING MACHINE

Walter E. Rooney, Bellingham, Wash., assignor to American Can Company, New York, N. Y., a corporation of New Jersey Application January 4, 1939, Serial No. 249,303

13 Claims. (Cl. 226—14)

The present invention relates to a tray loading machine for packing filled containers or cans into trays preparatory to cooking or processing same and has particular reference to placing the cans in predetermined positions in an orderly arrangement within holding trays of various dimensions moving in a continuous procession.

In the canning industry, filled cans coming from the closing machines are usually transferred by hand to the trays which hold the cans while they are being processed and also while they are being cooled. The cans are usually nested in the holding trays as far as the trays will permit so as to pack a certain number of cans in each tray.

The standard size of tray used in the Alaska salmon canning industry, as one example, is thirty eight inches square and a tray is made to hold 168 cans of the standard can size when the cans are placed one can deep and in 14 rows with 12 cans in a row. While this is the standard tray size, it has been found that these trays in use in different packers' plants vary considerably from the standard size, there being differences in width and in length of as much as one half inch, too large or too small. Since the can total of 168 cans has been the vital prerequisite in tray manufacture, if the width is short the length is usually over. This variance in tray dimensions has made it difficult to use a mechanical can loader.

Since even small packers carry a supply of as many as two thousand trays for almost daily use it will be seen that discarding of the trays now used, for more uniform size trays, is impractical. Rather a mechanical can loader to be successful must needs be sufficiently flexible to fit the trays and to compensate for variation. This has been accomplished in the present machine.

The instant invention contemplates overcoming the can loading difficulties by placing the cans in the trays mechanically and in a predetermined relation to the sides of the trays which positioning staggers the cans relative to each other so that they will nest as near together as possible. Thus trays now in existence may be used in the present machine and may be packed with the full number of cans and where the tray sizes vary greatly the number of cans is not sacrificed even though symmetrical or perfect nesting of the cans may not be obtained.

An object of the invention therefore is the provision of a can transfer machine wherein filled cans received in a continuous procession are picked up in rows and placed in moving trays in an arrangement of parallel rows which are staggered so that a predetermined number of cans will be packed in a given space, thereby saving manual handling of the individual cans.

Another object is the provision in a machine of this character of means for shifting the moving trays transversely of their path of travel as each row of cans is placed therein so that each alternate row will be indexed from one side of the tray while the in-between rows will be indexed from the opposite side of the tray, thereby adapting the machine to various widths of trays now in use.

Another object is the provision in such a machine of devices for feeding the trays along a predetermined path of travel in a step-by-step movement as the rows of cans are placed in them and for periodically advancing each tray, upon completion of its fill, a greater distance than such regular step-by-step advancement to compensate for the necessary space between the adjacent ends of trays passing in a continuous procession.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a tray loading machine embodying the instant invention, parts being broken away;

Fig. 2 is a side elevation of the machine shown in Fig. 1, with parts broken away;

Fig. 3 is a wiring diagram of the electric apparatus used in the machine;

Figs. 4 to 11, inclusive, are sectional details taken substantially along correspondingly numbered lines in Fig. 1; and Fig. 12 is an elevational detail taken substantially along a plane indicated by the line 12—12 in Fig. 2.

As a preferred embodiment of the invention the drawings illustrate a can loading machine in which filled cans A are normally received in a substantially continuous procession and are aligned at a receiving station B in a straight row extending transversely of the machine preparatory to being loaded into trays C. The trays C are advanced through the machine in spaced end to end relation by an inclined feeding device D which moves them slowly down the incline in a step by step movement, the inclined trays passing under the can receiving station B.

As a tray C passes under the can receiving station B, the cans aligned there are lifted by a magnetic transfer mechanism E and are placed a row at a time in the tray. In placing the rows of cans, the transfer mechanism during every other pass brings the cans straight back, while during alternate passes each can row is shifted transversely of the machine so that all of the cans will be in staggered formation, each can being as near as possible to its neighbors. The bottom of a tray while being loaded is at an incline which insures that each row of cans as brought into place moves down as far as possible against the cans below. This leaves the maximum of empty space above where the cans come into the tray.

For perfect nesting of the cans, the tray would have to be wide enough to allow a space of approximately one half a can diameter at one end of each row when the end can at the opposite end of the row is in engagement with the adjacent side wall of the tray. However, since the trays vary in width enough to make perfect nesting the exception rather than the rule, provision is made for as near a symmetrical nesting of the cans as is possible.

This resulting approximate nesting of the cans is effected by shifting the trays transversely of the machine just prior to the placing of a row of cans therein, so that the first can at one end of a row will be in engagement with the adjacent side wall of the tray when that row is placed in position. The last can in the succeeding row will be placed against the adjacent side wall of the tray on the opposite side of the machine when that later row is inserted in place. Thus the cans are in staggered positions.

By the time the trays reach the lower end of the inclined conveyor D they are fully loaded and are thence discharged to any suitable place of deposit for cooking.

Entrance of the cans A into the machine from any suitable source of supply, such as a retort or the like, is preferably effected by way of an endless feed-in belt conveyor 21 (Figs. 1 and 2) which is located along one side of a main frame 22 which supports the various parts of the machine. The feed-in belt takes over a pair of spaced pulleys 23 one pair of which is mounted at the entrance end of the machine on a short idler shaft 24 and the other pair at the opposite end of the machine on a belt drive shaft 25 which extends across the full width of the machine.

The shafts are carried in bearings 26 formed in a can entrance table 27 which is secured to the main frame 22 and over which the upper run of the feed-in belt travels. On the opposite side of the machine the drive shaft 25 is also journaled in a bearing 28 formed in a bracket secured to the main frame 22. Guide rails 29 secured to the table extend along the path of travel of the feed-in belt adjacent the outer edges thereof and thus maintain the cans on the belt in a straight line.

The feed-in belt 21 is continuously actuated. For this purpose the belt drive shaft 25 carries a sprocket 33 (Figs. 1 and 2) rotated by a chain 34 which also takes over a driving sprocket 35. Driving sprocket 35 is mounted on a cross-shaft 36 which is journaled in bearings 37 formed in a gear housing 38 of the main frame 22. The inner end of the shaft carries a gear 39 which meshes with an idler gear 40 mounted on a stub shaft 41 secured in the inner wall section of the housing. Idler gear 40 meshes with a driven gear 43 mounted on a cross-shaft 44 journaled in bearings 45 formed in the housing.

The outer end of the cross-shaft 44 carries a bevel gear 47 which meshes with a similar gear 48 secured to the lower end of a vertical shaft 49 disposed inside the gear housing. This vertical shaft is journaled in bearings 52 which are formed in the housing. At its upper end the vertical shaft carries a worm wheel 53 which is driven by a worm 54 keyed onto a main driving shaft 55 journaled in bearings 56 formed in the gear housing. The driving shaft extends outside of the gear housing and is rotated in any suitable manner, such as for example, by a pulley 57. The shaft and pulley may be rotated from any suitable source of power, preferably an electric motor which is indicated by the numeral 60 in the wiring diagram in Fig. 3.

The continuously moving feed-in belt 21 carries the entering cans A toward the right as viewed in Figs. 1 and 2, i. e., toward the belt drive shaft 25. Adjacent this shaft the guide rails 29 curve inwardly toward the can receiving station B and align with a can receiving belt 62 which extends transversely of the machine at station B (see also Fig. 10).

The receiving belt 62 takes over spaced pulleys 63 located on opposite sides of the machine and carried on short shafts 64 journaled in bearings 65 formed in brackets 66 on the main frame 22. The shaft 64 on the far side of the machine carries a bevel gear 67 which meshes with and is driven by a bevel gear 68 keyed onto the feed-in belt drive shaft 25. The receiving belt is driven a little faster than the feed-in belt in order to prevent any piling up of the cans.

Thus cans A carried by the feed-in belt 21 are transferred by the guide rails 29 onto the receiving belt 62, the cans crowding against each other in a straight line or row on the receiving belt. The outer guide rail 29 extends along the outer side of the receiving belt and thus maintains the received can in a straight line. The inner side of the belt is left open so that the cans may be more readily removed therefrom as will be hereinafter more fully explained. A bridge extension 69 of the feed-in table 27 is located under the curved portions of the guide rails 29 and thus provides a support for the cans while they are transferred from one belt to the other.

When a certain number of cans, preferably twelve, are aligned on the receiving belt 62, the cans following are held back until the twelve aligned cans are removed and placed in a tray C as hereinbefore mentioned. This cut-off of the cans is brought about by a sliding gate element 72 which is carried in a slideway 73 formed in a bracket 74 secured to the feed-in table 27 adjacent the can entrance end of the receiving belt 62.

The gate element is fastened to the lower end of a vertically disposed lever 76 carried intermediate its length on a pivot pin 77 secured in the bracket 74. The upper end of the gate lever is connected by a link 78 to a cam arm 79 (see also Fig. 7) carried on a pivot pin 81 secured in a lug 82 depending from the top of the gear housing 38. Intermediate its length the cam arm carries a cam roller 84 which operates in a cam groove 85 of a cam 86 mounted on a shaft 87 journaled in suitable bearings formed in the gear housing. The cam shaft 87 is continuously rotated by a bevel gear 88 which is keyed to the outer end of the shaft and which meshes with a bevel gear 89 mounted on the vertical drive shaft 49.

For proper operation of the machine the incoming cans A should be received in a substantially continuous procession so that the receiving station B will always receive its full quota of cans. This will insure packing of the trays C hereinbefore mentioned with a full load. Provision is thus made for stopping the operation of the machine if for any reason there is an unreasonable break in the procession of cans entering the machine.

Stopping of the machine is brought about by a can detector arm 91 (Figs. 1 and 2) which rides on the tops of the cans as they pass along on the belt conveyor 21. The arm is mounted on the inner end of a short shaft 92 carried in a bearing 93 formed in a bracket 94 secured to the side of the can table 27. The outer end of the shaft carries a tiltable mercury switch 95 which is connected into an electric circuit shown in the wiring diagram in Fig. 3 and which will be fully explained hereinafter.

As long as cans on the belt conveyor 21 are passing in a continuous procession the detector arm will be held up on top of the cans thereby maintaining the mercury switch in a position which will permit continued operation of the machine. However, when a break occurs in the line of cans passing under the detector arm the latter is left unsupported and hence falls down. This tilts the mercury switch into a position which breaks the machine circuit and thus stops the machine.

When cans again begin to be received on the now stationary belt they will push each other along the belt until the break in the line is closed. Cans thus moving in to close the break will raise the detector arm and thus tilt the mercury switch into machine operating position. The machine will thus begin operating again and then the belt conveyor will be set in motion to carry the cans along toward station B.

The trays C to be loaded with the cans A are supported on an inclined platform of spaced and parallel rollers 101 (Figs. 1, 2, 11 and 12) which extend transversely of the machine. These rollers are loosely mounted on roller shafts 102 the ends of which are secured in roller side plates 103. These side plates are connected to the main frame 22 by links 104.

The upper ends of the links are carried on pivot pins 105 secured in lugs 106 formed on the roller plates. The lower ends of the links are carried on pivot pins 107 secured in lugs 108 formed on the inside of the main frame 22. Guide members 109 interposed between the rollers and secured to cross bars 111, bolted to the side plates 103, prevent the ends of the trays from catching under the rollers when they first come into the machine.

The trays C are propelled down the inclined platform by the conveyor D hereinbefore mentioned. This conveyor includes a pair of endless chains 115 disposed one on each side of the machine adjacent to and parallel with the roller side plates 103. These chains take over sprockets 116 mounted on cross-shafts 117 journaled in bearings 118 formed in the main frame 22.

Cross bars 119 secured at their ends to the chains 115 and spaced at intervals along the length of the chains, control the passage of the trays down the inclined platform. These cross bars provide abutments against which the front ends of the trays engage and hold trays back as they roll down the inclined platform under their own weight. The distance between the cross bars 119 is substantially equal to the length of one tray holding 14 rows of cans with an additional clearance space equal to another row of cans.

The conveyor chains 115 are actuated with step by step movement by an intermittent motion ratchet device which includes a pawl 123 (Figs. 1, 2 and 8) and a ratchet wheel 124. The pawl is carried on a pivot pin 125 secured in an off-center position in an eccentric disc 126 mounted on the inner end of the gear shaft 44.

The ratchet wheel is mounted on the inner end of a ratchet shaft 128 carried in bearings 129 formed in the gear housing 38. This ratchet shaft is connected with the lower sprocket shaft 117 of the conveyor D by an endless chain 131 which takes over a sprocket 132 mounted on the ratchet shaft and over a similar sprocket 133 mounted on the lower conveyor shaft 117.

Thus every time the gear shaft 44 makes one revolution, the ratchet wheel is moved forward one tooth and accordingly the conveyor D is moved down the incline one step. This step is made equal to the space occupied by one row of cans in a tray C, so that as the conveyor moves the tray along one step at a time the cans from the receiving station B may be placed in the trays in adjacent rows. The inclined position of the tray permits settling of the cans toward the lower end of the tray.

When a tray C is fully loaded, the tray following is moved down by the conveyor D a double step in order to obtain the clearance space between trays previously mentioned, so that the following tray will be in correct position to receive the next row of cans from station B as they are delivered in regular time and without interruption of transfer. This extra movement is effected by a pawl shoe 135 which is secured to the pawl 123 and which cooperates with a pin 136 projecting from the side of the ratchet wheel.

The ratchet wheel makes one complete revolution for each tray. At the completion of this revolution the pawl shoe 135 engages the pin 136 instead of the pawl engaging into one of the ratchet teeth and thus rotates the ratchet wheel through a space of two teeth, i. e., the equivalent of two steps of regular movement of the conveyor D. Thus by means of this movement the tray next in line is brought into position ready to receive its cans and without the need of delaying the delivery of the cans until the tray is properly positioned.

Delivery of the cans A into the trays C from the station B is effected by the magnetic transfer device E hereinbefore mentioned. This transfer device includes an electro-magnet 141 (Figs. 1 and 2) which extends across the machine and which is long enough to pick up the twelve segregated cans disposed at station B. The magnet is fastened by pivot pins 142 to a cross beam 143.

The transfer device is movable in three directions, vertically, longitudinally and transversely of the machine. These movements are coordinated so that one row of the cans will first be raised, then drawn back, shifted sidewise for nesting and lastly lowered into position in the tray. The transfer device returns through these same movements in reverse order for a subsequent load, i. e. another row of cans. For this purpose the magnetic cross beam 143 is pivoted to the outer ends of a pair of parallel arms 145.

The inner ends of the arms are pivotally connected to a slide 146 (see also Fig. 4) mounted in a slideway 147 formed in a rocker bracket 148.

The vertical movement of the transfer device is brought about by cam action. For this purpose the rocker bracket 148 is formed on the inner end of a sleeve 149 carried in bearings 151 formed in legs 152 depending from the top of the gear housing 38. The outer end of the sleeve carries a cam arm 154 (see also Fig. 6) which is provided with a cam roller 155 operating in a cam groove 156 formed in the inner face of a double cam 157. The cam is mounted on the cross shaft 87.

Horizontal longitudinal movement of the transfer device is also effected by cam action which shifts the slide 146 in its slideway 147 first on a backward can delivering stroke and then on a forward returning stroke. This horizontal longitudinal movement is brought about by a gear 161 which meshes with a rack 162 formed in the bottom of the slide. The gear is mounted on the inner end of a shaft 163 carried in a bore 164 formed in the rocker bracket sleeve 149.

The shaft extends beyond the sleeve and is carried in a bearing 166 formed on the gear housing 38. The outer end of the shaft carries a gear 167 (see also Fig. 5) which meshes with a segment gear 168. This segment gear is formed on a cam arm 169 mounted on a pivot stud 171 secured in a lug 172 formed on the gear housing 38. The free end of the cam arm carries a cam roller 173 which operates in a cam groove 174 formed in the outer face of the double cam 157.

Transverse shifting of the magnet 141 is effected by the movement of a link 177 (Figs. 1 and 2) which is carried intermediate its length on a pivot pin 178 secured in an extension 179 of the rocker bracket 148. The link thus rocks on the bracket. The outer end of the link is connected to a cross bar 181 which is pivotally secured to both of the parallel arms 145 in parallelogram fashion.

The inner end of the link carries a cam roller 183 (see Fig. 4) which operates in a cam groove 184 of a barrel cam 185 mounted loosely on the rocker bracket sleeve 149. The cam is secured to the side of a gear 186. This gear meshes with and is driven in time with the other moving parts of the machine by a gear 187 (see Fig. 9) mounted on the cross shaft 87.

The gear 186 is timed relative to the other moving parts of the machine so that it will make only one revolution while the other gears and cams closely associated with it make two. This rotates the cam 185 through only one half revolution while the magnet 141 is moving through one cycle and accordingly the effect of the cam is to shift the magnet sidewise at every alternate cycle. In other words for every other row of cans placed in a tray C, the magnet is not shifted sidewise but is only moved backward and forward.

On all of the in-between rows of cans, the magnet is shifted sidewise as well as rearwardly and forwardly. It will thus be obvious that the cans are placed in the trays in staggered formation. The cam shifts the magnet a fixed stroke which is such as to properly nest the cans in a tray regardless of any slight off-standard dimension.

In the transverse shifting of the trays as hereinbefore mentioned they are moved against side guides 191 (Figs. 1, 2 and 11) which serve as stops for locating a tray in its proper position. These side guides extend the full length of the machine and are parallel with and adjacent to the conveyor chains 115. The guides are secured to lugs or bracket members 192 formed on the side of the main frame 22.

This transverse shifting of the trays preparatory to receiving a row of cans, is effected by shifting the supporting rollers 101 and their side plates 103 on their links 104. This is brought about by an eccentric or crank arm 194 (Figs. 2 and 12) having a pin 195 which operates in a slot 196 in a lug 197 formed on the side of one of the roller plates 103. The crank arm is formed on the upper end of a vertical crank shaft 198 journaled in a bearing 199 extended from the inside of the gear housing 38. The lower end of the crank shaft carries a gear 201 which meshes with and is driven by a pinion 202 on the main vertical shaft 49.

Hence as the crank shaft rotates the crank arm, the crank pin moves through an arcuate path of travel and being confined in the slot 196 it shifts the side plates 103 and the attached rollers transversely of the machine. The trays supported on the rollers are thereby shifted into engagement with the side guide on one side of the machine during one portion of the crank pin cycle and into engagement with the side guide on the opposite side of the machine during another portion of the crank pin cycle.

In the operation of the machine a tray C about to receive its first row of cans is shifted transversely so that its side wall which is shown at the top in Fig. 1, engages against the side guide 191 shown at top. The magnet transfer device E carrying one row of contiguous cans then moves back (toward the left in Fig. 1) so that the cans are suspended over the tray and then moves down placing this row of cans in the tray, the cans engaging against the front wall (right as viewed in the figure) of the tray and the first can in the row (at the top) engaging against the wall of the tray shown above.

This leaves a space between the last can shown at the bottom and the side wall of the tray which is below as clearly shown in Fig. 1. This space varies with the size of the tray used. This first row of cans is thus registered with the wall of the tray shown above. After release of the cans as will be hereinafter explained the magnet transfer device moves up out of the tray and further moves forward (toward the right in the figure) into position over the receiving station B in readiness to pick up a second row of cans.

While the transfer device is moving forward into position over the receiving station B as just described, the tray C is advanced down the incline substantially the space of one row of cans and is simultaneously shifted transversely of the machine. This transverse shifting now moves the side wall of the tray (which is above as viewed in Fig. 1) away from the upper side guide 191 (as shown in the figure) and brings the lower side wall of the tray into engagement or register with the side guide 191 shown at the bottom.

The tray remains in this position while the magnet transfer device E picks up the second row of cans, moves back with them to a position over the tray adjacent the first placed row, and now shifts sidewise which in Fig. 1 is toward the bottom side wall of the tray as shown. The transfer device stops at the end of the stroke and the last or lower can in the row is then in register with this lower side wall of the tray. The second row of cans is then placed in the tray by lowering of the transfer device. The row has thus been registered with the lower side wall of the tray as shown in the drawings and is in back of the first placed row.

Such register in some cases will not perfectly nest the cans of the first and second rows but as the tray advances down the incline and as it is shifted from one side to another, the resulting shaking of the cans is sufficient to spread them and thus obtain the required nesting. Hence for each row of cans placed in the tray, alternate rows are registered with one side of the tray while the inbetween rows are registered with the opposite side of the tray.

A row of cans being placed in a tray C is guided into position by a curved guide plate 205 (Figs. 1 and 10). This guide plate extends the full width of the station B and is adjustably secured to the back can guide at that station so that it can be properly positioned relative to the trays passing under it.

When a row of cans is in place in a tray the magnet is de-energized so that it will release the cans. This is done by a normally closed limit or toggle switch 207 (Figs. 6 and 9) which is operated by an extension 208 of the cam arm 154, the extension 208 striking the switch at the end of the throw of the cam arm. The magnet is thus momentarily de-energized for a period long enough for the magnet to lift out of the region of the placed cans before it is again energized.

Referring now to the wiring diagram in Fig. 3 it will be seen that the limit switch 207 is connected by a wire 211 to the magnet 141. The magnet is also connected by wires 212, 213 to a source of electric energy such as a generator 214. The limit switch 207 is also connected by wires 215, 216 to the generator. Hence as long as the limit switch remains closed the circuit is complete and energy flows through the magnet and energizes it. Conversely when the limit switch is opened by the cam arm extension 208, the circuit is broken and the magnet becomes deenergized until the switch again closes.

Generator 214 is also included in the circuit serving the normally open mercury switch 95 which operates to stop the machine when a break occurs in the line of cans passing into the machine as hereinbefore mentioned. One terminal of the mercury switch is connected by the wire 213 to the generator. The other terminal of the switch is connected by a wire 218 to one side of a solenoid 219. The other side of the solenoid is connected by the wire 216 to the generator.

The solenoid 219 is provided with a core 221 which forms the movable element of a normally closed start-stop switch 222. A spring normally presses the movable element into engagement with switch contacts 223, 224. Contact 223 is connected by a wire 225 to a heavy duty generator 226 which in turn is connected by a wire 227 to the machine motor 60. Switch contact 224 is connected by a wire 228 to the motor.

Hence as long as cans are passing into the machine in a continuous procession the mercury switch 95 remains in its normal open position and the solenoid 219 remains de-energized. The spring of switch 222 thereby keeps the switch closed and energy from the generator 226 excites the machine motor 60 and hence keeps the machine in operation. However, when a break occurs in the line of cans and the mercury switch is tilted into closed position, the circuit which includes the solenoid becomes closed and hence the solenoid becomes energized.

The movable core 221 of the solenoid is hence drawn into the solenoid against the resistance of the switch spring. This opens the switch 222 and thereby breaks the motor circuit. The motor thus ceases operation and the machine is stopped until the mercury switch is again opened. When this happens the solenoid is again de-energized and the switch 222 is thus closed by the tension of its spring. The motor circuit is thus re-established and the motor resumes operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for loading cans in staggered rows in trays, which comprises in combination: mechanism for advancing trays along a predetermined path of travel, movable instrumentalities for placing rows of a definite number of cans into said trays, and means for independently shifting said instrumentalities and said trays transversely of their paths of travel, said shifting effecting the placing of alternate rows of cans in the tray relative to one side of the tray while the inbetween rows of cans are placed relative to the opposite side of the tray, so that the cans will nest together.

2. A machine for loading cans in staggered rows in trays, which comprises in combination: mechanism for advancing trays along a predetermined path of travel, movable instrumentalities for placing rows of a definite number of cans into said trays, elements for moving said instrumentalities transversely of the path of advancement of the trays to place the cans in a staggered formation, and means for shifting said trays transversely of their path of travel, said shifting of said trays and transverse movement of said instrumentalities cooperating to insure the placing of alternate rows of cans in the tray relative to one side of the tray while the inbetween rows of cans are placed relative to the opposite side of the tray, so that the cans will nest together.

3. A machine for loading cans in staggered rows in holding trays, which comprises in combination, mechanism for advancing trays along a predetermined path of travel, means for aligning cans in a row adjacent the path of travel of said trays, movable instrumentalities for placing rows of a definite number of cans into said trays, and independent means for shifting said trays and said instrumentalities transversely of their paths of travel, said shifting movements cooperating to effect the placing of alternate rows of cans in the tray relative to one side of the tray while the inbetween rows of cans are placed relative to the opposite side of the tray, so that the cans will nest together.

4. A machine for loading cans in staggered rows in holding trays, which comprises in combination: an inclined tray conveyor, actuating devices for propelling said conveyor and a tray positioned thereon in a step-by-step movement along a predetermined path of travel, movable instrumentalities for placing rows of a definite number of cans into said trays in time with the advancement thereof, and independent means for shifting said trays and said can placing instrumentalities transversely of their respective paths of travel, said shifting movements cooperating to effect the placing of alternate rows of cans in the tray relative to one side of the tray while the in-between rows of cans are placed relative to the opposite side of the tray, so that the cans will nest together as nearly as the width of the tray will permit.

5. A machine for loading cans in staggered rows in holding trays, which comprises in combination, an inclined roller platform for supporting trays to be loaded, a conveyor adjacent said platform and having cross bars extending across said platform for controlling the advancement of said trays therealong, movable instrumentalities for placing rows of a definite number of cans into said trays, means for shifting said platform transversely of the path of travel of the trays, means for shifting said can placing instrumentalities transversely of their normal path of travel, said shifting movements cooperating to effect the placing of alternate rows of cans in the tray relative to one side of the tray while the in-between rows of cans are placed relative to the opposite side of the tray, so that the cans will nest together.

6. A machine for loading cans in staggered rows in holding trays, which comprises in combination, an inclined roller platform for supporting trays to be loaded, a conveyor adjacent said platform and having cross bars extending across said platform for controlling the advancement of said trays therealong, side guides along said platform for said trays, movable instrumentalities for placing rows of a definite number of cans into said trays, and independent means for shifting said can placing instrumentalities and said platform transversely of the path of travel of the trays, the shifting movement of said platform engaging said trays first with one of said side guides and then with the opposite of said side guides, both of said shifting movements cooperating to the placing of alternate rows of cans in a said tray relative to one side of the tray while the in-between rows of cans are placed relative to the opposite side of the tray thus nesting the cans together in the tray.

7. A machine for loading cans in staggered rows in holding trays, which comprises in combination: mechanism for advancing trays along a predetermined path of travel, devices for moving cans to be loaded into said trays along a predetermined path of travel, means for receiving and holding an aligned row of cans, a can segregating element for stopping further admission of cans into said can receiving means when a definite number of cans are aligned thereon, movable instrumentalities for picking up said aligned row of segregated cans and for placing it into a said tray, and independent means for shifting said instrumentalities and said trays transversely of their normal paths of travel, both of said shifting movements cooperating to effect the placing of alternate rows of cans in the tray relative to one side of the tray while the in-between rows of cans are placed relatively to the opposite side of the tray.

8. A machine for loading cans in staggered rows in trays, which comprises in combination, mechanism for advancing trays along a predetermined path of travel, movable instrumentalities for placing rows of a definite number of cans into said trays, devices for guiding said cans into said trays, and independent means for shifting said can placing instrumentalities and said trays transversely of their paths of travel, said shifting movements cooperating to effect the placing of alternate rows of cans in the tray relative to one side of the tray while the in-between rows of cans are placed relative to the opposite side of the tray, so that the cans will nest together.

9. In a machine for loading cans in staggered rows in trays, the combination of mechanism for advancing trays along a predetermined path of travel, an electro-magnet for placing rows of a definite number of cans into said trays, actuating devices for said electro-magnet, said devices moving said magnet into close association with said cans then moving it in the opposite direction for placing the cans in a tray while simultaneously moving the magnet sidewise for bringing the cans into nesting position, and means for shifting said trays transversely of their path of travel, said shifting effecting the placing of alternate rows of cans in the tray with one end of the row engaging one side of the tray while the opposite end of each in-between row of cans engages the opposite side of the tray, so that the cans will nest together.

10. In a machine for loading cans in staggered rows in holding trays, the combination of mechanism for advancing trays along a predetermined path of travel, an electromagnet for placing rows of a definite number of cans into said trays, actuating devices for said electro-magnet, said actuating devices moving said magnet into close association with said cans then moving it in the opposite direction for placing the cans in a tray while simultaneously moving the magnet sidewise for bringing the cans into nesting position, elements for de-energizing said magnet at a predetermined time to release the cans therefrom, and means for shifting said trays transversely of their path of travel to locate the alternate rows of cans in the tray with one end of the row against one side of the tray while locating the in-between rows of cans with the opposite end of the row against the opposite side of the tray.

11. In a machine for loading cans in staggered rows in holding trays, the combination of mechanism for advancing trays along a predetermined path of travel, an electro-magnet for holding a definite number of cans in a row while placing the rows into said trays, actuating devices for said electro-magnet, said devices moving said magnet for alternate rows of cans into close association with said cans then moving it in the opposite direction for placing the cans in a tray and for the in-between rows of cans repeating these movements while simultaneously moving the magnet sidewise to bring the cans into nesting position, and means for shifting said trays transversely of their path of travel to place alternate rows of cans in the tray relative to one side of the tray and to place the in-between rows of cans relative to the opposite side of the tray, so that the cans will nest as close together as the width of the tray will permit.

12. A machine for loading cans in staggered rows in trays, which comprises in combination: mechanism for advancing trays along a predetermined path of travel, instrumentalities for placing rows of a definite number of cans into said trays, and means for effecting relative movement between a said tray and said instrumentalities transversely of the path of travel of the trays to insure staggering said rows of cans so that the cans will nest together in the trays.

13. In a machine for loading cans in staggered rows in holding trays, the combination of mechanism for advancing trays along a predetermined path of travel, an electro-magnet for placing rows of a definite number of cans into said trays, a reciprocatable slide adjacent said magnet, a parallelogram system of links connecting said magnet with said slide, devices for reciprocating said slide to bring said magnet into the region of said cans and to move said magnet into the region of said trays, cam members for tilting said slide to bring said magnet into engagement with said cans in one position of the slide and to place said cans into said trays in another position of the slide, and cam elements for shifting said parallelogram links and said magnet to nest said cans.

WALTER E. ROONEY.